| (12) United States Patent<br>Kinoshita et al. | (10) Patent No.: US 12,103,585 B2<br>(45) Date of Patent: Oct. 1, 2024 |
|---|---|

(54) STEERING CONTROL DEVICE, STEERING CONTROL METHOD, AND COMPUTER PROGRAM PRODUCT

(71) Applicant: DENSO CORPORATION, Kariya (JP)

(72) Inventors: Tomohiro Kinoshita, Kariya (JP); Hiroki Iwasa, Kariya (JP)

(73) Assignee: DENSO CORPORATION, Kariya (JP)

( * ) Notice: Subject to any disclaimer, the term of this patent is extended or adjusted under 35 U.S.C. 154(b) by 238 days.

(21) Appl. No.: 17/819,207

(22) Filed: Aug. 11, 2022

(65) Prior Publication Data

US 2022/0388572 A1 Dec. 8, 2022

Related U.S. Application Data

(63) Continuation of application No. PCT/JP2020/048690, filed on Dec. 25, 2020.

(30) Foreign Application Priority Data

Feb. 14, 2020 (JP) .................................. 2020-023571

(51) Int. Cl.
 *B62D 15/02* (2006.01)
(52) U.S. Cl.
 CPC .................................. *B62D 15/025* (2013.01)
(58) Field of Classification Search
 CPC .............................. B62D 15/025; B62D 6/04
 See application file for complete search history.

(56) References Cited

U.S. PATENT DOCUMENTS

| 9,592,850 B1 * | 3/2017 | Kataoka ............... B62D 15/025 |
| 2011/0238254 A1 * | 9/2011 | Mulder ................ B60W 40/02 |
| | | 701/1 |
| 2018/0281850 A1 * | 10/2018 | Mizoguchi ........... B62D 15/025 |
| 2018/0364733 A1 * | 12/2018 | Aiba ..................... B62D 15/029 |
| 2019/0039648 A1 * | 2/2019 | Kitta .................... B62D 5/0463 |
| 2019/0161117 A1 * | 5/2019 | Suzuki .................. B60W 30/12 |

FOREIGN PATENT DOCUMENTS

| JP | 2010-188917 A | 9/2010 |
| JP | 2015-151085 A | 8/2015 |

* cited by examiner

*Primary Examiner* — George C Jin
(74) *Attorney, Agent, or Firm* — MASCHOFF BRENNAN

(57) ABSTRACT

A steering control device is configured to control a steering actuator to perform (i) a following control for causing a steering of a vehicle to automatically follow a target trajectory and (ii) an assist control for assisting the steering of the vehicle. The steering control device includes an assist setting unit and a limiting unit. The assist setting unit is configured to set an assist instruction value to instruct the assist control to the steering actuator. The limiting unit is configured to limit the assist instruction value depending on a magnitude of a deviation of a traveling position of the vehicle from the target trajectory.

24 Claims, 7 Drawing Sheets

STEERING CONTROL DEVICE, STEERING CONTROL METHOD, AND COMPUTER PROGRAM PRODUCT

CROSS REFERENCE TO RELATED APPLICATION

The present application is a continuation application of International Patent Application No. PCT/JP2020/048690 filed on Dec. 25, 2020, which designated the U.S. and claims the benefit of priority from Japanese Patent Application No. 2020-023571 filed on Feb. 14, 2020. The entire disclosures of all of the above applications are incorporated herein by reference.

TECHNICAL FIELD

The present disclosure relates to a technique to control steering by a steering actuator of a vehicle.

BACKGROUND

A device configured to control a lane keep control amount by EPS (Electric Power Steering) required to keep the traveling of the vehicle along the target trajectory is known. This device is configured to set a smaller lane keep control amount for a larger steering operation amount by the driver.

SUMMARY

A first aspect of the present disclosure is a steering control device configured to control a steering actuator to perform (i) a following control for causing a steering of a vehicle to automatically follow a target trajectory and (ii) an assist control for assisting the steering of the vehicle according to a manual operation to a steering member. The steering control device includes: an assist setting unit configured to set an assist instruction value to instruct the assist control to the steering actuator; and a limiting unit configured to limit the assist instruction value depending on a magnitude of a deviation of a traveling position of the vehicle from the target trajectory.

A second aspect of the present disclosure is a method for a processor to control a steering actuator to perform (i) a following control for causing a steering of a vehicle to automatically follow a target trajectory and (ii) an assist control for assisting the steering of the vehicle according to a manual operation to a steering member. The method includes: setting an assist instruction value to instruct the assist control to the steering actuator; and limiting the assist instruction value depending on a magnitude of a deviation of a traveling position of the vehicle from the target trajectory.

A third aspect of the present disclosure is a computer program product for controlling a steering actuator to perform (i) a following control for causing a steering of a vehicle to automatically follow a target trajectory and (ii) an assist control for assisting the steering of the vehicle according to a manual operation to a steering member, the computer program product being stored on at least one non-transitory computer readable medium and comprising instructions configured to, when executed by at least one processor, cause the at least one processor to: set an assist instruction value to instruct the assist control to the steering actuator; and limit the assist instruction value depending on a magnitude of a deviation of a traveling position of the vehicle from the target trajectory.

EMBODIMENTS

Figure 1:
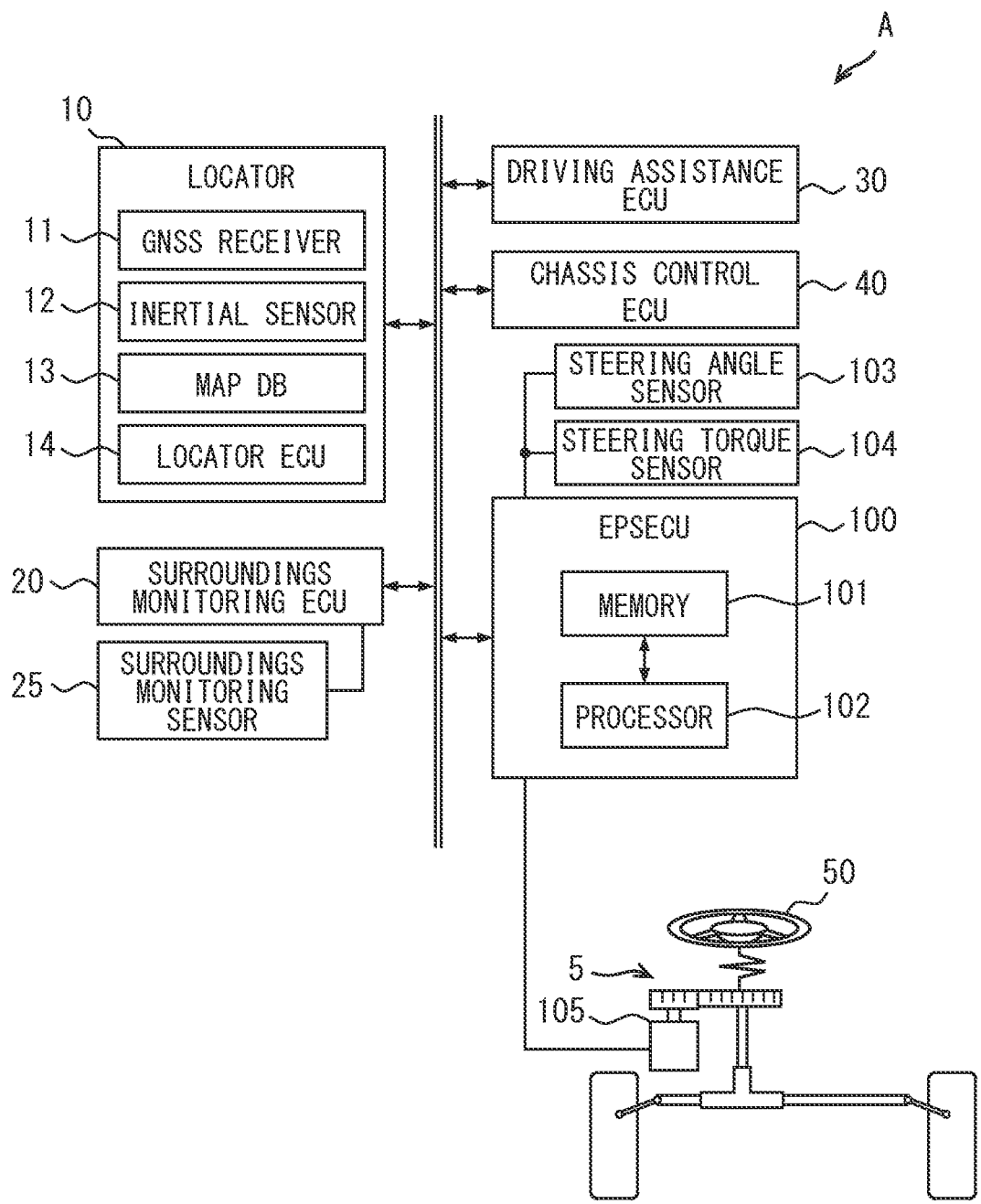
FIG. 1 is a diagram showing a system including a steering control device.

In recent years, it has been expected that in EPS control, assist control in response to steering input can coexist with following steering control, which follows the target trajectory. However, when the following steering control is implemented, torsion bar may be twisted, causing vibration in the steering wheel. When the assist control and the following steering control coexist, the vibration may be suppressed by assist control in response to torsion bar torsion, but in that case, the assist control may interfere with the following steering control and reduce vehicle followability to the target trajectory.

First Embodiment

A steering control device according to a first embodiment will be described with reference to FIGS. 1-7. The steering control device of the first embodiment is provided by an EPS-ECU 100 which is an electronic control device mounted on a vehicle A. The EPS-ECU 100 is electrically connected with a steering actuator 5 mounted in the vehicle A to control the steering actuator 5. Further, the EPS-ECU 100 is connected with a locator 10, a surroundings monitoring ECU 20, a driving assistance ECU 30, a chassis control ECU 40, a steering angle sensor 103, and a steering torque sensor 104 through a communication bus.

The steering actuator 5 includes an electric EPS motor 105 and a reducer to control steering of the vehicle A. The steering actuator 5 may constitute a power steering system mechanically cooperating with a steering wheel 50 which is a steering member of the vehicle A. The steering actuator 5 may constitute a steer-by-wire system which is mechanically disconnected but electrically connected with the steering wheel 50 of the vehicle A.

The steering actuator 5 generates the torque by the EPS motor 105 in accordance with an output instruction value, and outputs the torque after amplifying it by the reducer. The torque is transmitted from the steering actuator 5 to the steering tire, and thus the steering angle of the steering tire is changed.

The locator 10 generates location information of the vehicle by a complex positioning method that combines multiple types and pieces of acquired information. The locator 10 includes a GNSS (Global Navigation Satellite System) receiver 11, an inertial sensor 12, and a map database (hereinafter, DB) 13, and a locator ECU 14. The GNSS receiver 11 receives positioning signals from multiple positioning satellites. The inertial sensor 12 is a sensor that detects the inertial force acting on the vehicle A. The inertia sensor 12 includes a gyro sensor and an acceleration sensor, for example.

The map DB 13 is a nonvolatile memory and stores map data such as link data, node data, road shapes, buildings and the like. The map data may include a three-dimensional map including feature points of road shapes and buildings. The three-dimensional map may be generated based on a captured image by REM (Road Experience Management). Further, the map data may include traffic regulation information, road construction information, meteorological information, signal information and the like. The map data stored in the map DB 13 updates regularly or at any time based on the latest information received by the in-vehicle communication device.

The locator ECU 14 mainly includes a microcomputer equipped with a processor, a memory, an input/output interface, and a bus connecting these elements. The locator ECU 14 combines the positioning signals received by the GNSS receiver 11, the map data of the map DB 13, and the measurement results of the inertia sensor 12 to sequentially detect the position of the vehicle A (hereinafter, subject vehicle position). The vehicle position may include, for example, coordinates of latitude and longitude. The subject vehicle position may be measured using a travel distance obtained from signals sequentially output from the vehicle speed sensor mounted on the vehicle A. When a three-dimensional map provided by a road shape and a point group of feature points of a structure is used as map data, the locator ECU 14 may specify the position of the own vehicle by using the three-dimensional map and the detection results of the periphery monitoring sensor 25 without using the GNSS receiver 11.

The locator ECU 14 is configured to estimate the subject vehicle position using a Kalman filter based on acquired information. The locator ECU 14 may be configured to estimate the subject vehicle position using a particle filter. The locator ECU 14 is configured to sequentially provide the subject vehicle position to the driving assistance ECU 30 and the chassis control ECU 40. The locator ECU 14 is configured to provide information about estimation error in the subject vehicle position to the EPS-ECU 100. When the Kalman filter is used to estimate the subject vehicle position, the information about the estimation error is, for example, the error covariance of the Kalman filter. When the particle filter is used to estimate the subject vehicle position, the information about the estimation error is, for example, the probability of the presence of vehicle A at the estimated subject vehicle position.

The surroundings monitoring ECU 20 is configured by a microcomputer as a main body that includes a processor, a memory, an I/O, and buses connecting these with each other, and performs various processes by executing control programs stored in the memory. The surroundings monitoring ECU 20 acquires detection result from the surroundings monitoring sensor 25, and recognizes the traveling environment of the subject vehicle based on the detection result. The surroundings monitoring sensor 25 is an autonomous sensor that monitors environment around the vehicle A, and includes an LiDAR (Light Detection and Ranging/Laser Imaging Detection and Ranging), which detects a point cloud of feature points of object on land, and a periphery monitoring camera, which captures images of a predetermined area including the front of the vehicle A. The surroundings monitoring sensor 25 may include a millimeter wave radar, sonar, and the like. The surroundings monitoring ECU 20 recognizes the existence and the positions of obstacles on the path of travel and other vehicles such as preceding vehicles, vehicles traveling beside the vehicle A, and oncoming vehicles by image analysis processing based on the point cloud image acquired from the LiDAR and the captured image acquired from the camera. The surroundings monitoring ECU 20 sequentially provides the analyzed recognition results to the locator ECU 14 and the driving assistance ECU 30, for example.

The driving assistance ECU 30 is configured by a microcomputer as a main body that includes a processor, a memory, an I/O, and buses connecting these with each other, and performs various processes by executing control programs stored in the memory. The driving assistance ECU 30 generates the target trajectory T along which the vehicle A travels in the automated driving or the advanced driving assistance based on the location information and the recognition results of the traveling environment. The target trajectory T is a traveling path along which the vehicle A travels and contains information about the target position of the vehicle A. The driving assistance ECU 30 provides the generated target trajectory T to the chassis control ECU 40.

The chassis control ECU 30 is configured by a microcomputer as a main body that includes a processor, a memory, an I/O, and buses connecting these with each other, and performs various processes by executing control programs stored in the memory. The chassis control ECU 40 generates the target instruction value for the traveling control of the vehicle A required for the traveling along the target trajectory T.

Specifically, the chassis control ECU 40 generates the following instruction value for causing the vehicle to follow the target trajectory T. The following instruction value is a target value related to the steering or turning for following the target trajectory T. The following instruction value may be a target value indicating the steering angle or a target value of the rotation angle of the EPS motor 105. The chassis control ECU 40 calculates the deviation of the subject vehicle position in the lateral direction with respect to the target trajectory T and generates the following instruction value based on the calculated deviation. The lateral direction is a direction perpendicular to the target trajectory T or a direction perpendicular to the traveling direction of the vehicle A. The chassis control ECU 40 sequentially provides the generated following instruction value and the deviation to the EPS-ECU 100. The chassis control ECU 40 may generate an acceleration instruction value and a deceleration instruction value in addition to the following instruction value to provide them to an ECU controlling the acceleration and deceleration.

The steering angle sensor 103 is a sensor for detecting a steering angle, and is installed, for example, in a steering column including the steering shaft. The steering torque sensor 104 is a sensor that detects a steering torque, which is an applied torque applied to a steering shaft. The steering torque sensor 104 detects a torque applied to a torsion bar as the steering torque based on a torsion angle of the torsion bar provided on the steering shaft, for example.

The EPS-ECU 100 is configured to control the steering device based on the information provided by the locator ECU 14, the chassis control ECU 40, the steering angle sensor 103, and the steering torque sensor 104. The EPS-ECU 100 mainly includes a memory 101, a processor 102, an input/output interface, a bus connecting these components, and the like. The processor 102 is a hardware for arithmetic processing. The processor 102 includes, as a core, at least one type of, for example, a CPU (Central Processing Unit), a GPU (Graphics Processing Unit), an RISC (Reduced Instruction Set Computer) CPU, and so on.

The memory 101 is at least one type of non-transitory tangible storage medium, such as a semiconductor memory, a magnetic storage medium, and an optical storage medium, for non-transitory storing or memorizing computer readable programs and data. The memory 101 stores various programs executed by the processor 102, such as a steering control program described later.

Figure 2:
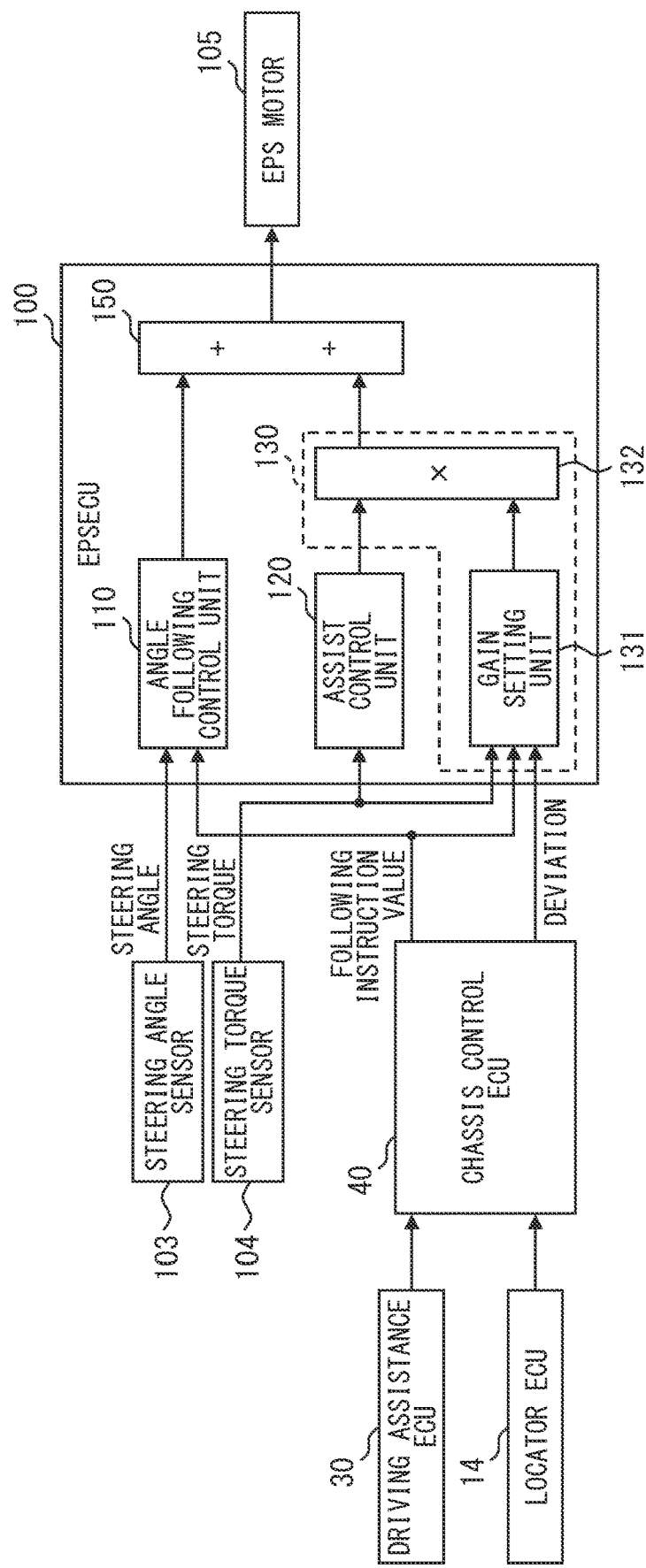
FIG. 2 is a block diagram showing an example of a function executed by the steering control device.

The processor 102 executes multiple instructions included in a steering control program stored in the memory 101. The EPS-ECU 100 builds multiple functional units for controlling the steering actuator 5 to perform (i) the following control for causing the steering of the vehicle A to automatically follow the target trajectory T and (ii) the assist control for assisting the steering of the vehicle A according to the manual operation to the steering member. As described above, in the EPS-ECU 100, the steering control program stored in the memory 101 causes the processor 102 to execute a plurality of instructions, thereby building a plurality of functional units. Specifically, the EPS-ECU 100 builds an angle following control unit 110, an assist control unit 120, a limiting unit 130, and an adding unit 150 as shown in FIG. 2.

The angle following control unit 110 is configured to execute the following control by acquiring the following instruction value from the chassis control ECU 40 and generating an angle control instruction value for changing the current steering angle to the following instruction value. Specifically, the angle following control unit 110 calculates the difference between the following instruction value acquired from the chassis control ECU 40 and the steering angle acquired from the steering angle sensor 103. Then, the angle following control unit 110 calculates, as the angle control instruction value, a current instruction value to cause the EPS motor 105 to generate the following torque required to change the steering angle to the following instruction value based on the difference. The angle following control unit 110 sequentially provides the generated angle control instruction value to the adding unit 150. The angle following control unit 110 is an example of an acquiring unit.

The assist control unit 120 is configured to generate an assist instruction value to instruct to the steering actuator 5 the assist control to assist the steering of the vehicle A according to the manual operation of the steering wheel 50. In this example, the assist instruction value is a current instruction value for generating an assist torque for assisting the steering operation by the driver so that a transmission feeling corresponding to a road surface reaction force (road surface load) and a feel corresponding to a steering state are realized. The assist control unit 120 calculates a base assist instruction value for obtaining the transmission feeling according to the road surface reaction force based on a steering torque and a vehicle speed. In addition, the assist control unit 120 calculates an assist compensation value corresponding to the steering state based on the steering torque and the motor rotation angular velocity. The assist control unit 120 generates an assist instruction value by adding, to the base assist instruction value, a value obtained by multiplying a gain corresponding to the vehicle speed with the assist compensation value. The assist control unit 120 outputs the generated assist instruction value to the addition unit 150. The assist control unit 120 is an example of an assist setting unit.

The limiting unit 130 is configured to limit the assist instruction value in accordance with the deviation of the position of the vehicle A with respect to the target trajectory T. Specifically, the limiting unit 130 is configured to limit the assist instruction value when the following instruction value in a specific frequency range is without an acceptable range. The limiting unit 130 has a gain setting unit 131 and a multiplying unit 132 as sub-functional units.

The gain setting unit 131 is configured to set a limitation degree for limiting the assist instruction value when the magnitude of the following instruction value in the specific frequency range is outside the acceptable instruction value range. The specific frequency range is a frequency range in which vibration of the steering wheel 50 is estimated to occur, and is, for example, a band centered on 5 Hz. The gain setting unit 131 applies the band pass filter to the following instruction value to acquire the magnitude of the following instruction value in the specific frequency range.

The gain setting unit 131 sets a gain value that is to be multiplied by the assist instruction value to decrease the assist instruction value. The gain value is a value adjusted between 0 and 1. Since the gain value is less than 1, the assist instruction value is limited. A smaller gain value means a larger limit on the assist instruction value. When the gain value is set to 1 or the gain value setting is interrupted, the limitation of the assist instruction value is stopped. Stopping the limitation of the assist instruction value can be rephrased as maintaining the assist instruction value.

Figure 3:
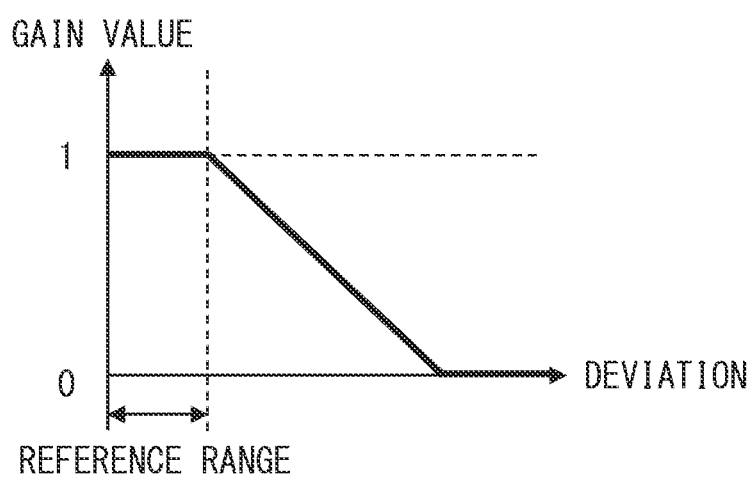
FIG. 3 is a graph showing an example of a relationship between a gain value and a deviation.

The gain setting unit 131 sets the gain value that greatly limits the assist instruction value as the deviation increases. Specifically, the gain value set by the gain setting unit 131 decreases with the increase of the deviation. For example, the gain setting unit 131 may set the gain value based on the map that defines the relationship between the deviation and the gain value. The gain value is determined to (i) keep the assist instruction value within the reference range which is equal to or wider than the acceptable deviation range, and (ii) continuously decrease the assist instruction value as the assist instruction value increases away from the reference range, as shown in FIG. 3. That is, the gain value is 1 when the deviation is within the reference range. Outside the reference range, the gain value linearly decreases with the increase of the deviation. The gain setting unit 131 provides the set gain value to the multiplying unit 132. The gain value is an example of a gain.

The gain setting unit 131 executes determination process for multiple conditions and sets the gain value based on the determination results.

The gain setting unit 131 determines whether the deviation is within the acceptable deviation range.

Subsequently, the gain setting unit 131 determines whether the reliability of the traveling position of the vehicle A (subject vehicle position) is outside the acceptable reliability range. The reliability is the certainty of the estimated subject vehicle position and is a value related to the magnitude of error in the estimation of the subject vehicle position. The smaller the reliability is, the larger the error in the subject vehicle position is. That is, when the reliability is small, the vehicle A is more likely to be located at a position far from the estimated subject vehicle position.

Figure 4:
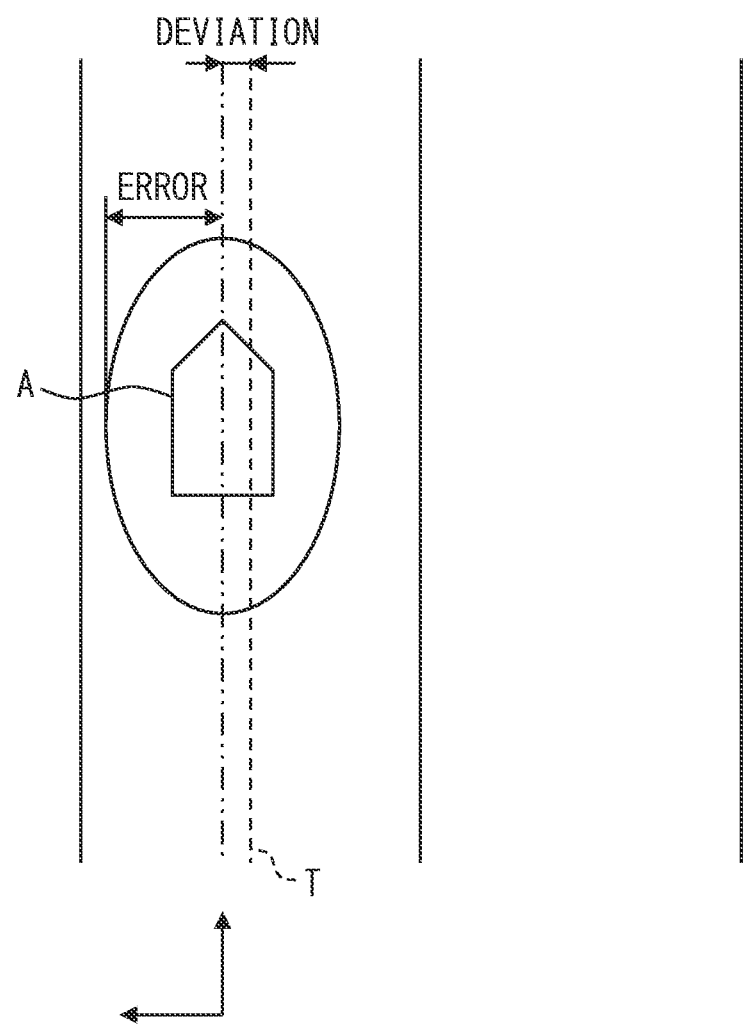
FIG. 4 is a diagram for explaining a reliability of a subject vehicle position.

For example, when the subject vehicle position is estimated using the Kalman filter, the locator ECU 14 provides an abbreviated oval-shaped error as shown in FIG. 4 based on the error covariance of Kalman filter. The gain setting unit 131 sets the reliance level based on the magnitude of the lateral radius (lateral error) in this error ellipse.

Figure 5:
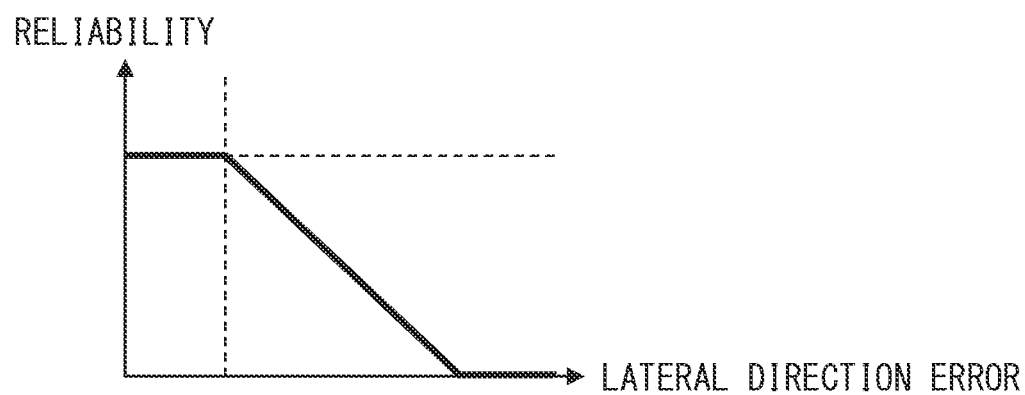
FIG. 5 is a graph showing an example of a relationship between the reliability and an error of the subject vehicle position in a lateral direction.
Figure 6:
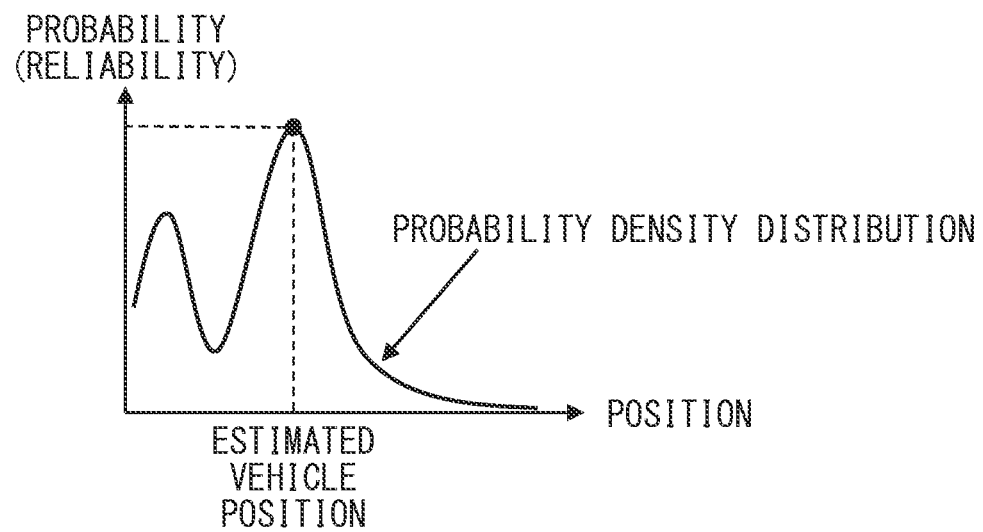
FIG. 6 is a graph showing an example of a relationship between the reliability and the subject vehicle position.

The reliability is defined, as shown in FIG. 5, by the map that indicates a smaller value for a larger error in the lateral direction. For example, the reliability is the maximum value when the error in the lateral direction is within a predetermined range, and the reliability decreases with the increase of the error in the lateral direction when the error is outside the predetermined range. The gain setting unit 131 sets the reliability based on this relationship. When the subject vehicle position is estimated using the particle filter, the probability of the subject vehicle position in the probability distribution of the existence of the vehicle A is used as the reliability (see FIG. 6). The gain setting unit 131 performs the determination based on the information about the error in the subject vehicle position acquired from the locator ECU 14, for example.

The gain setting unit 131 determines whether the manual steering amount that is estimated to be input to the steering wheel 50 by the driver is outside the acceptable steering range. The manual steering amount is, for example, a driver input torque generated by the steering by the driver. The driver input torque is determined based on the steering angle and the steering torque.

The gain setting unit 131 sets the gain value to 1 regardless of the magnitude of the deviation when it is determined that the deviation is within the acceptable deviation range, the reliability is outside the acceptable reliability range, or the manual steering amount is outside the acceptable steering range. The gain setting unit 131 determines to set the gain value depending on the deviation when it is determined that the deviation is outside the acceptable deviation range, the reliability is within the acceptable reliability range, or the manual steering amount is within the acceptable steering range. The gain setting unit 131 may perform the above processes in a different order or perform the above processes in parallel. When the gain setting unit 131 determines to set the gain value depending on the magnitude of the deviation, the gain setting unit 131 sets the gain value depending on the deviation based on the above-described map, and then outputs the set gain value to the multiplying unit 132.

The multiplying unit 132 applies the gain value to the assist instruction value by multiplying the gain value acquired from the gain setting unit 131 by the assist instruction value acquired from the assist control unit 120. The assist instruction value is limited by applying the gain value, which is less than 1, to the assist instruction value by the multiplying unit 132, and the limitation of the assist instruction value is stopped by applying the gain value, which is 1, to the assist instruction value. The multiplying unit 132 outputs the multiplication results to the adding unit 150.

The adding unit 150 determines the output instruction value by adding the angle control instruction value generated by the angle following control unit 110 to the assist instruction value applied to the gain value by the multiplying unit 132. The adding unit 150 sequentially outputs the determined output instruction value to the EPS motor 105 of the steering actuator 5.

Figure 7:
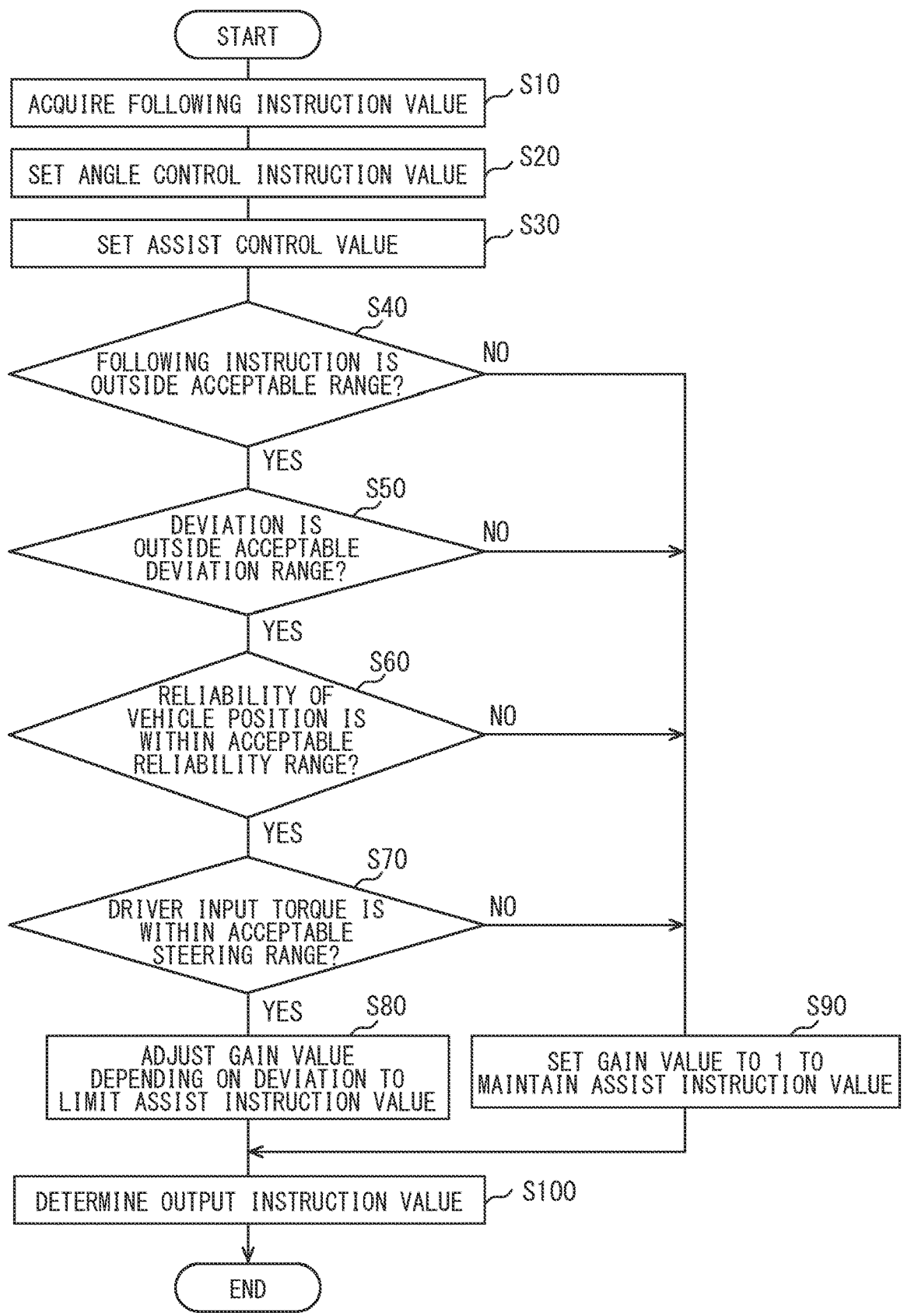
FIG. 7 is a flowchart showing an example of a steering control method performed by the steering control device.

Next, the flowchart of the steering control method executed by the EPS-ECU 100 in collaboration with the functional blocks will be described below according to FIG. 7 with reference to FIG. 2. In a flowchart to be described later, "S" means multiple steps of the flowchart to be executed by multiple instructions included in the steering control program.

In S10, the angle following control unit 110 acquires the following instruction value. Subsequently, in S20, the angle following control unit 110 sets the angle control instruction value based on the following instruction value and the steering angle. In S30, the assist control unit 120 sets the assist instruction value based on the steering torque.

In S40, the limiting unit 130 determines whether the following instruction value in the specific frequency range is outside the acceptable range. When it is determined that the following instruction value is outside the acceptable range, the limiting unit 130 determines in S50 whether the deviation is outside the acceptable deviation range. When it is determined that the deviation is outside the acceptable deviation range, the limiting unit 130 determines in S60 whether the reliability of the subject vehicle position is within the acceptable reliability range. When it is determined that the reliability is within the acceptable reliability range, the limiting unit 130 determines in S70 whether the driver input torque is within the acceptable steering range. When it is determined that the driver input torque is within the acceptable steering range, the limiting unit 130 sets the gain value based on the deviation and multiplies the assist instruction value by the set gain value to limit the assist instruction value.

In contrast, a negative determination is made in any one of S40-S70, the limiting unit 130 sets in S90 the gain value to 1 to maintain the assist instruction value by multiplying the assist instruction value by 1 as the gain value. Subsequent to S80 or S90, in S100, the adding unit 150 determines the output instruction value by adding the angle control instruction value to the assist instruction value to which the gain value is applied, and outputs the output instruction value to the steering actuator 5. The execution of the flow ends in response to the output of the output instruction value.

S10 is an example of a following acquiring process, S30 is an example of an assist setting process, and S40-S90 are an example of a limiting process.

The description below explains operations and effects provided by the first embodiment.

According to the first embodiment, the assist instruction value is limited depending on the magnitude of the deviation of the subject vehicle position of the vehicle A with respect to the target trajectory T. Accordingly, when the deviation of the subject vehicle position from the target trajectory T is great, the priority is given to the following control to return to the target trajectory T. Therefore, the decrease in followability can be suppressed.

According to the first embodiment, the limitation of the assist instruction value is stopped when it is determined that the deviation is within the acceptable deviation range. Accordingly, the vibration suppression by the assist control is prioritized when the deviation from the target trajectory T is small.

Further, according to the first embodiment, since the limitation of the assist instruction value is stopped when it is determined that the manual steering amount that is estimated to be input to the steering member is outside the acceptable steering range, the assist control for the manual steering can be prioritized when the manual steering amount by the driver is large.

Further, according to the first embodiment, when it is determined that the reliability of the traveling position is outside the acceptable reliability range, the limitation of the assist instruction value is stopped. Accordingly, the vibration suppression by the assist control can be prioritized when the reliability of the traveling position is low.

Second Embodiment

In a second embodiment, a modification example of the EPS-ECU 100 described in the first embodiment will be described. In the second embodiment, the gain setting unit 131 is configured to determine whether a traveling space in the lane for the vehicle A is outside an acceptable space range instead of the determination related to the reliability of the traveling position of the vehicle A.

The traveling space is an index indicating how much space from the side edge of the lane can be secured while the vehicle A travels in the lane. For example, the traveling space is a distance from the vehicle A to a side edge of the lane. The distance may be a distance from a side of the vehicle A to the side edge of the lane or a distance from a center part of the vehicle A to the side edge of the lane. The side edge may be a lane marking defining the lane or an edge of the lane. The traveling space may be a width of the lane.

The gain setting unit 131 is configured to set the gain value to 1 regardless of the deviation when it is determined that the traveling space is within the acceptable reliability range. In contrast, the gain setting unit 131 is configured to determine to set the gain value depending on the magnitude of the deviation when it is determined that the traveling space is outside the acceptable space range and the positive determinations are made in the other determination processes for setting the gain value.

Figure 8:
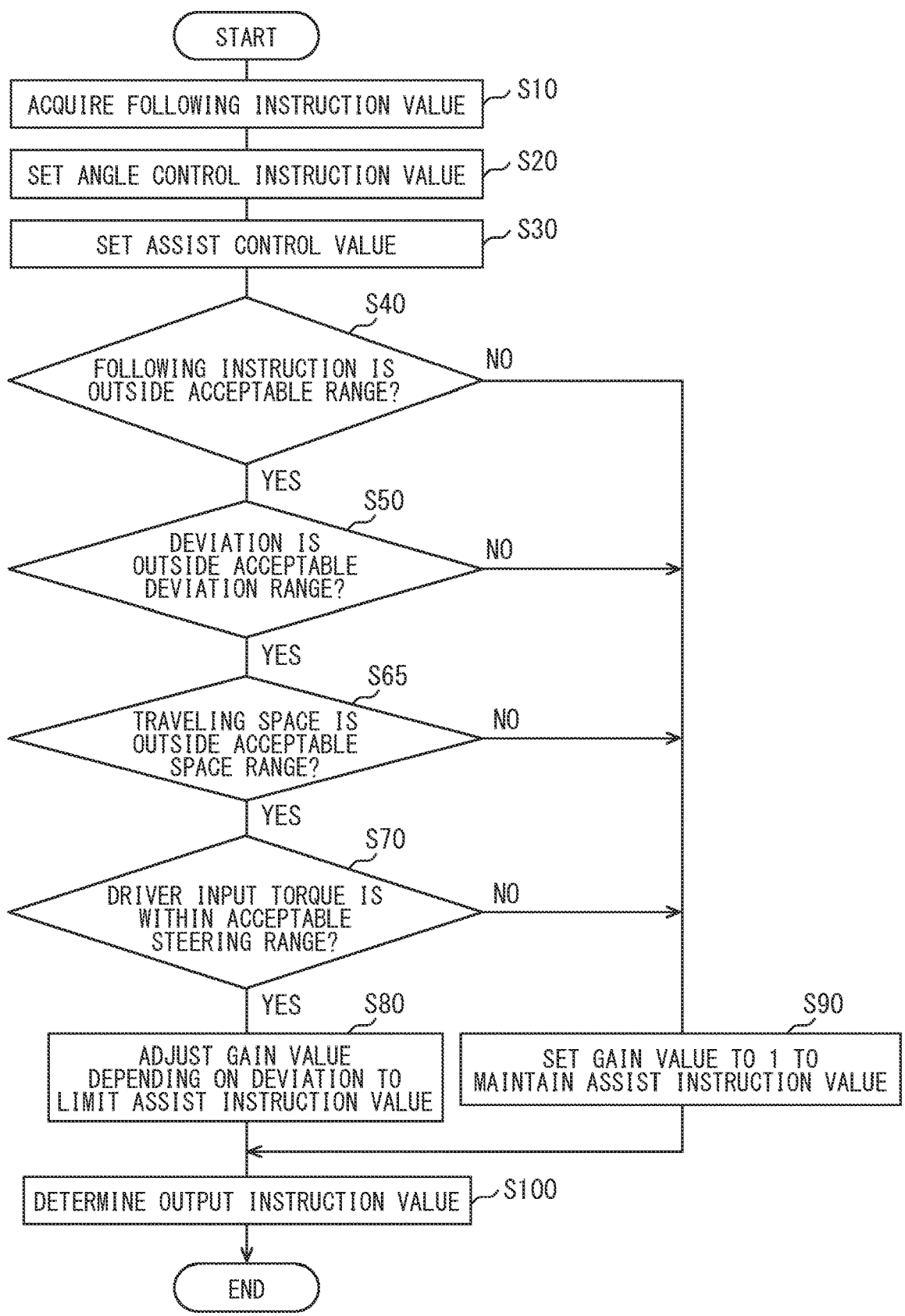
FIG. 8 is a flowchart showing an example of a steering control method performed by a steering control device according to a second embodiment.

Next, the flow of the steering control method executed by the EPS-ECU 100 in the second embodiment will be described with reference to FIG. 8. As for the steps with the same reference numerals as those in FIG. 7 of the first embodiment, the description in the first embodiment is incorporated. In S50, when it is determined that the deviation is outside the acceptable deviation range, the flow proceeds to S65. In S65, the gain setting unit 131 determines whether the traveling space in the lane for the vehicle A is outside the acceptable space range. When it is determined that the traveling space is outside the acceptable space range, the flow proceeds to S70. In contrast, when it is determined that the traveling space is within the acceptable space range, the flow proceeds to S90.

According to the second embodiment, the limitation of the assist instruction value is stopped when it is determined that the traveling space in the lane for the vehicle A is within the acceptable space range. Accordingly, the vibration suppression by the assist control is prioritized when the vehicle A can travel with an enough space from the side edge of the lane even if the deviation is large.

In the second embodiment, the gain setting unit 131 is configured to perform the determination about the traveling space instead of the determination about the reliability. However, the gain setting unit 131 may be configured to perform the determination about the traveling space in addition to the determination about the reliability.

Other Embodiments

The disclosure in the present specification is not limited to the illustrated embodiments. The disclosure encompasses the illustrated embodiments and variations based on the embodiments by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the description of the embodiment. It should be understood that some disclosed technical ranges are indicated by description of claims, and includes every modification within the equivalent meaning and the scope of description of claims.

In the above-described embodiments, the gain setting unit 131 is configured to set the gain value linearly changing with the deviation. However, the relationship between the deviation and the gain value is not limited to this. For example, the gain value may change non-linearly according to the deviation or in a stepwise manner according to the deviation.

In the above-described embodiments, the gain setting unit 131 is configured to determine whether to limit or maintain the assist instruction value based on the results of the determinations. However, at least one determination process may be omitted.

The EPS-ECU 100 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The EPS-ECU 100 may be provided by a set of computer resources linked by a computer or a data communication device. For example, a part of the functions provided by the EPS-ECU 100 in the above-described embodiments may be realized by another ECU.

What is claimed is:

1. A steering control device configured to control a steering actuator to perform (i) a following control for causing a steering of a vehicle to automatically follow a target trajectory and (ii) an assist control for assisting the steering of the vehicle according to a manual operation to a steering member, the steering control device comprising:
    an assist setting unit configured to set an assist instruction value to instruct the assist control to the steering actuator; and
    a limiting unit configured to limit the assist instruction value depending on a magnitude of a deviation of a traveling position of the vehicle from the target trajectory.

2. The steering control device according to claim 1, further comprising:
    an acquiring unit configured to acquire a following instruction value to follow the target trajectory, wherein
    the limiting unit is configured to limit the assist instruction value when the following instruction value in a specific frequency range is outside an acceptable range.

3. The steering control device according to claim 1, wherein
    the limiting unit is configured to limit the assist instruction value such that the assist instruction value is smaller as the deviation is larger.

4. The steering control device according to claim 1, wherein
    the limiting unit is configured to stop limiting the assist instruction value when it is determined that the deviation is within an acceptable deviation range.

5. The steering control device according to claim 4, wherein
    the limiting unit is configured to set a gain that
        keeps the assist instruction value within a reference range which is equal to or wider than the acceptable deviation range, and continuously decreases the assist instruction value as the assist instruction value increases away from the reference range.

6. The steering control device according to claim 1, wherein
the limiting unit is configured to stop limiting the assist instruction value when it is determined that a manual steering amount, which is estimate to be input to the steering member, is outside an acceptable steering range.

7. The steering control device according to claim 1, wherein
the limiting unit is configured to stop limiting the assist instruction value when it is determined that a traveling space in a lane for the vehicle is within an acceptable space range.

8. The steering control device according to claim 1, wherein
the limiting unit is configured to stop limiting the assist instruction value when it is determined that a reliability of the traveling position is outside an acceptable reliability range.

9. A method for a processor to control a steering actuator to perform (i) a following control for causing a steering of a vehicle to automatically follow a target trajectory and (ii) an assist control for assisting the steering of the vehicle according to a manual operation to a steering member, the method comprising:
setting an assist instruction value to instruct the assist control to the steering actuator; and
limiting the assist instruction value depending on a magnitude of a deviation of a traveling position of the vehicle from the target trajectory.

10. The method according to claim 9, further comprising:
acquiring a following instruction value to follow the target trajectory, wherein
in the limiting the assist instruction value, the assist instruction value is limited when the following instruction value in a specific frequency range is outside an acceptable range.

11. The method according to claim 9, wherein
in the limiting the assist instruction value, the assist instruction value is limited such that the assist instruction value is smaller as the deviation is larger.

12. The method according to claim 9, wherein
in the limiting the assist instruction value, the limitation of the assist instruction value is stopped when it is determined that the deviation is within an acceptable deviation range.

13. The method according to claim 12, wherein
in the limiting the assist instruction value, a gain is set such that
the assist instruction value is kept within a reference range which is equal to or wider than the acceptable deviation range, and
the assist instruction value is continuously decreased as the assist instruction value increases away from the reference range.

14. The method according to claim 9, wherein
in the limiting the assist instruction value, the limitation of the assist instruction value is stopped when it is determined that a manual steering amount, which is estimate to be input to the steering member, is outside an acceptable steering range.

15. The method according to claim 9, wherein
in the limiting the assist instruction value, the limitation of the assist instruction value is stopped when it is determined that a traveling space in a lane for the vehicle is within an acceptable space range.

16. The method according to claim 9, wherein
in the limiting the assist instruction value, the limitation of the assist instruction value is stopped when it is determined that a reliability of the traveling position is outside an acceptable reliability range.

17. A computer program product for controlling a steering actuator to perform (i) a following control for causing a steering of a vehicle to automatically follow a target trajectory and (ii) an assist control for assisting the steering of the vehicle according to a manual operation to a steering member, the computer program product being stored on at least one non-transitory computer readable medium and comprising instructions configured to, when executed by at least one processor, cause the at least one processor to:
set an assist instruction value to instruct the assist control to the steering actuator; and
limit the assist instruction value depending on a magnitude of a deviation of a traveling position of the vehicle from the target trajectory.

18. The computer program product according to claim 17, wherein the instructions are configured to, when executed by the at least one processor, further cause the at least one processor to:
acquire a following instruction value to follow the target trajectory; and
limit the assist instruction value when the following instruction value in a specific frequency range is outside an acceptable range.

19. The computer program product according to claim 17, wherein the instructions are configured to, when executed by the at least one processor, further cause the at least one processor to:
limit the assist instruction value such that the assist instruction value is smaller as the deviation is larger.

20. The computer program product according to claim 17, wherein the instructions are configured to, when executed by the at least one processor, further cause the at least one processor to:
stop limiting the assist instruction value when it is determined that the deviation is within an acceptable deviation range.

21. The computer program product according to claim 20, wherein the instructions are configured to, when executed by the at least one processor, further cause the at least one processor to:
set a gain that
keeps the assist instruction value within a reference range which is equal to or wider than the acceptable deviation range, and
continuously decreases the assist instruction value as the assist instruction value increases away from the reference range.

22. The computer program product according to claim 17, wherein the instructions are configured to, when executed by the at least one processor, further cause the at least one processor to:
stop limiting the assist instruction value when it is determined that a manual steering amount, which is estimate to be input to the steering member, is outside an acceptable steering range.

23. The computer program product according to claim 17, wherein the instructions are configured to, when executed by the at least one processor, further cause the at least one processor to:

stop limiting the assist instruction value when it is determined that a traveling space in a lane for the vehicle is within an acceptable space range.

24. The computer program product according to claim 17, wherein the instructions are configured to, when executed by the at least one processor, further cause the at least one processor to:
stop limiting the assist instruction value when it is determined that a reliability of the traveling position is outside an acceptable reliability range.

* * * * *